United States Patent
Ye et al.

(10) Patent No.: US 7,605,222 B2
(45) Date of Patent: Oct. 20, 2009

(54) COPOLYETHERIMIDES

(75) Inventors: Qing Ye, Schenectady, NY (US); David Bruce Hall, Ballston Lake, NY (US); William David Richards, Scotia, NY (US); Daniel Joseph Brunelle, Burnt Hills, NY (US); Havva Yagci Acar, Sariyer-Istanbul (TR)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 281 days.

(21) Appl. No.: 11/210,164

(22) Filed: Aug. 22, 2005

(65) Prior Publication Data

US 2007/0043203 A1 Feb. 22, 2007

(51) Int. Cl.
C08G 73/00 (2006.01)

(52) U.S. Cl. ......................... 528/170; 528/125; 528/126; 528/128; 528/171; 528/174; 528/176; 528/179; 528/183; 528/185; 525/432; 525/436; 525/439; 525/420

(58) Field of Classification Search ................. 528/170, 528/322, 353, 125, 126, 128, 172–174, 179, 528/183, 185, 188, 220, 229, 176; 525/432, 525/436, 439, 420
See application file for complete search history.

(56) References Cited

U.S. PATENT DOCUMENTS

| | | | |
|---|---|---|---|
| 2,991,273 A | 7/1961 | Hechelhammer et al. | |
| 2,999,835 A | 9/1961 | Goldberg | |
| 3,028,365 A | 4/1962 | Schnell et al. | |
| 3,148,172 A | 9/1964 | Fox | |
| 3,271,367 A | 9/1966 | Schnell et al. | |
| 3,271,368 A | 9/1966 | Goldberg et al. | |
| 3,787,364 A | 1/1974 | Wirth et al. | |
| 3,847,867 A | 11/1974 | Heath et al. | |
| 3,847,869 A | 11/1974 | Williams, III | |
| 3,850,885 A | 11/1974 | Takekoshi et al. | |
| 3,852,242 A | 12/1974 | White | |
| 3,855,178 A | 12/1974 | White et al. | |
| 3,983,093 A | 9/1976 | Williams, III et al. | |
| 4,217,438 A | 8/1980 | Brunelle et al. | |
| 4,273,712 A | 6/1981 | Williams, III | |
| 4,460,778 A | 7/1984 | Brunelle | |
| 4,595,760 A | 6/1986 | Brunelle | |
| 5,116,975 A | 5/1992 | Brunelle | |
| 5,132,423 A | 7/1992 | Brunelle et al. | |
| 5,229,482 A | 7/1993 | Brunelle | |
| 5,830,974 A | 11/1998 | Schmidhauser et al. | |
| 5,908,915 A * | 6/1999 | Brunelle ..................... | 528/170 |
| 6,849,706 B1 * | 2/2005 | Brunelle et al. ............. | 528/170 |

OTHER PUBLICATIONS

DM White et al., "Polyetherimides Via Nitro-Displacement Polymerization: Monomer Synthesis and $^{13}$C-NMR Analysis of Monomers and Polymers", Journal of Polymer Science: Polymer Chemistry Edition, vol. 19, pp. 1635-1658, 1981.

* cited by examiner

*Primary Examiner*—James Seidleck
*Assistant Examiner*—Gregory Listvoyb

(57) ABSTRACT

Copolyetherimides compositions having high glass transition temperatures and outstanding ductility are presented. The copolyetherimides having $M_w$ of at least 40,000 comprising isomeric bis(phthalimide) structural units within a relatively narrow range of isomer proportions exhibited Tgs of at least 240° C. and outstanding Notched Izod values. The copolyetherimides comprise oxydianiline residues and structural units of the formulas (I) and (II) (III). The copolyetherimides are characterized by a mole percentage of structural units derived from 4,4'-biphenol in a range from about 55% to about 85% of all bisphenol-derived structural units present in the copolyetherimide composition; a mole percentage of structural units derived from bisphenol A in a range from about 45% to about 15% of all bisphenol-derived structural units present in the copolyetherimide composition; and a total mole percentage of structural units derived from bisphenol A or 4,4'-biphenol of at least 95% of all bisphenol-derived structural units present in the copolyetherimide composition.

24 Claims, No Drawings

COPOLYETHERIMIDES

BACKGROUND OF INVENTION

This invention relates to copolyetherimides, and more particularly to a new genus of copolyetherimides characterized by such advantageous properties as good ductility, good melt flow properties and high heat resistance.

Polyetherimides are a well-known class of commercially available polymers having excellent chemical resistance, high temperature stability and electrical and mechanical properties. An important subgenus of polyetherimides comprises polymers prepared by the reaction of diamines such as m-phenylenediamine with dianhydrides such as the dianhydride of 2,2-bis[4-(3,4-dicarboxyphenoxy)phenyl]-propane. As disclosed, for example, in U.S. Pat. No. 5,229,482, such polyetherimides may also be prepared by the reaction, typically in the presence of a phase transfer catalyst, of a bisphenol alkali metal salt with a bis(chlorophthalimide) such as 1,3-bis[N-(4-chlorophthalimido)benzene]. The latter method has gained favor in recent years by reason of its relative simplicity (e.g., a minimum number of steps) and high yield.

Various properties of polyetherimides could benefit from improvement. They include melt flow; heat resistance, which is related to heat distortion temperature; and ductility, which can be measured by temperature at which the transition from the brittle to the ductile state occurs.

SUMMARY OF INVENTION

In one aspect the present invention provides a new class of copolyetherimides which have outstanding mechanical and other properties.

Accordingly, the invention includes in one embodiment copolyetherimides having a glass transition temperature of at least 240° C., and a weight average molecular weight as determined by gel permeation chromatography relative to polystyrene standards of at least 40,000 grams per mole. The copolyetherimides comprise structural units of the formulas (I) and (II)

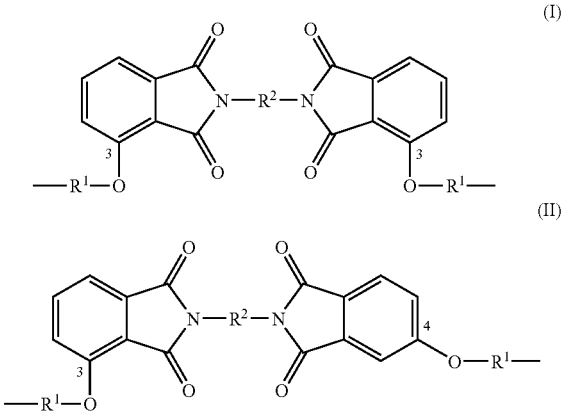

and structural units of the formula (III)

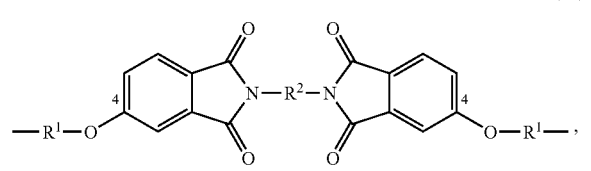

wherein $R^1$ is independently at each occurrence a divalent aromatic radical derived from bisphenol A or 4,4'-biphenol; $R^2$ is a divalent aromatic radical having formula (IV)

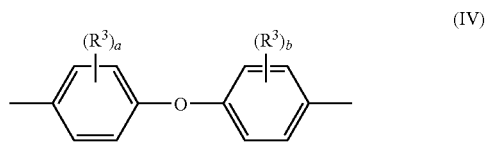

wherein $R^3$ is independently at each occurrence halogen, a $C_1$-$C_{10}$ aliphatic radical, a $C_3$-$C_{12}$ cycloaliphatic radical, or a $C_3$-$C_{15}$ aromatic radical, and "a" and "b" are independently at each occurrence integers from 0 to 4.

The copolyetherimides are characterized by a mole percentage of structural units derived from 4,4'-biphenol in a range from about 55% to about 85% of all bisphenol-derived structural units present in the copolyetherimide composition; a mole percentage of structural units derived from bisphenol A in a range from about 45% to about 15% of all bisphenol-derived structural units present in the copolyetherimide composition; and a total mole percentage of structural units derived from bisphenol A or 4,4'-biphenol of at least 95% of all bisphenol-derived structural units present in the copolyetherimide composition.

In addition, the copolyetherimides are characterized by a total amount of bisimide-containing structural units. Structural units I, II, and III represent at least 95 percent of the total amount of bisimide-containing structural units.

Additionally, the copolyetherimides are characterized by a molar ratio of structural subunits (V) and (VI)

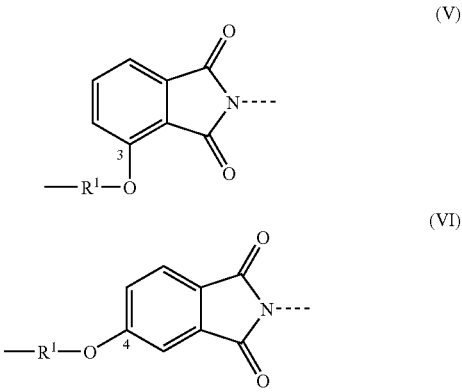

said molar ratio being in a range from about 85 mole percent (V) to about 99 mole percent (V) and about 15 mole percent (VI) to about 1 mole percent (VI).

In another embodiment the invention includes copolyetherimides having a glass transition temperature of at least 240° C., and a weight average molecular weight as determined by gel permeation chromatography relative to polystyrene standards of at least 40,000 grams per mole, said copolyetherimide comprising structural units of the formulas (IX) and (X)

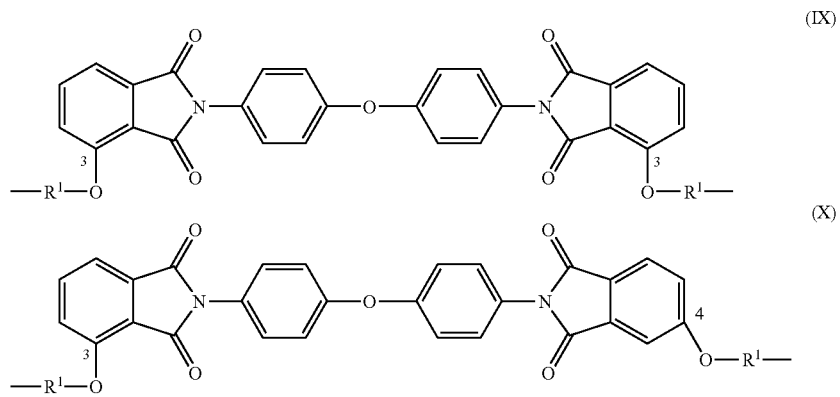

(IX)

(X)

and structural units of the formula (XI),

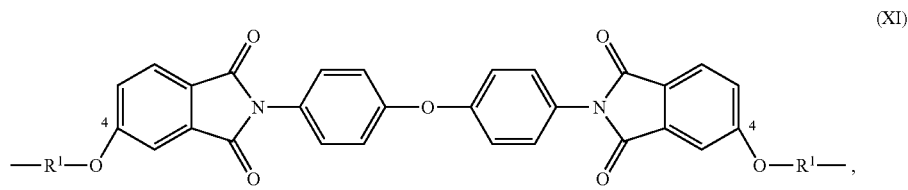

(XI)

wherein R¹ is independently at each occurrence a divalent aromatic radical derived from bisphenol A or 4,4'-biphenol;

said copolyetherimide being characterized by a mole percentage of structural units derived from 4,4'-biphenol in a range from about 55% to about 85% of all bisphenol-derived structural units present in the copolyetherimide composition;

said copolyetherimide being characterized by a mole percentage of structural units derived from bisphenol A in a range from about 45% to about 15% of all bisphenol-derived structural units present in the copolyetherimide composition;

said copolyetherimide being characterized by a total mole percentage of structural units derived from bisphenol A or 4,4'-biphenol of at least 95% of all bisphenol-derived structural units present in the copolyetherimide composition;

said copolyetherimide being characterized by a total amount of bisimide-containing structural units, said structures IX, X, and XI representing at least 95 percent of the total amount of bisimide-containing structural units;

said copolyetherimide being characterized by a molar ratio of structural subunits (V) and (VI)

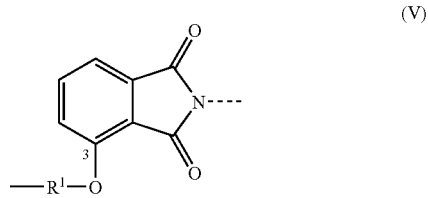

(V)

-continued

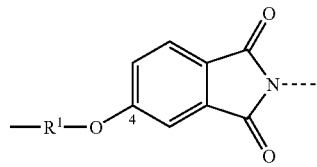

(VI)

said molar ratio being in a range from about 85 mole percent (V) to about 99 mole percent (V) and about 15 mole percent (VI) to about 1 mole percent (VI).

In yet another embodiment the invention provides an article comprising one or more of the novel copolyetherimides disclosed herein.

Various other features, aspects, and advantages of the present invention will become more apparent with reference to the following description and appended claims.

DETAILED DESCRIPTION

The present invention may be understood more readily by reference to the following detailed description of preferred embodiments of the invention and the examples included therein. In the following specification and the claims which follow, reference will be made to a number of terms which shall be defined to have the following meanings.

The singular forms "a", "an" and "the" include plural references unless the context clearly dictates otherwise.

"Optional" or "optionally" means that the subsequently described event or circumstance may or may not occur, and that the description includes instances where the event occurs and instances where it does not.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —$(CH_2)_4$—. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehydes groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group which is an alkyl group. Similarly, the 2-nitrophenyl group is a $C_6$ aromatic radical comprising a nitro group, the nitro group being a functional group. Aromatic radicals include halogenated aromatic radicals such as 4-trifluoromethylphenyl, hexafluoroisopropylidenebis(4-phen-1-yloxy) (i.e., —$OPhC(CF_3)_2PhO$—), 4-chloromethylphen-1-yl, 3-trifluorovinyl-2-thienyl, 3-trichloromethylphen-1-yl (i.e., 3-$CCl_3Ph$-), 4-(3-bromoprop-1-yl)phen-1-yl (i.e., 4-$BrCH_2CH_2CH_2Ph$-), and the like. Further examples of aromatic radicals include 4-allyloxyphen-1-oxy, 4-aminophen-1-yl (i.e., 4-$H_2NPh$-), 3-aminocarbonylphen-1-yl (i.e., $NH_2COPh$-), 4-benzoylphen-1-yl, dicyanomethylidenebis(4-phen-1-yloxy) (i.e., —$OPhC(CN)_2PhO$—), 3-methylphen-1-yl, methylenebis(4-phen-1-yloxy) (i.e., —$OPhCH_2PhO$—), 2-ethylphen-1-yl, phenylethenyl, 3-formyl-2-thienyl, 2-hexyl-5-furanyl, hexamethylene-1,6-bis(4-phen-1-yloxy) (i.e., —$OPh(CH_2)_6PhO$—), 4-hydroxymethylphen-1-yl (i.e., 4-$HOCH_2Ph$-), 4-mercaptomethylphen-1-yl (i.e., 4-$HSCH_2Ph$-), 4-methylthiophen-1-yl (i.e., 4-$CH_3SPh$-), 3-methoxyphen-1-yl, 2-methoxycarbonylphen-1-yloxy (e.g. methyl salicyl), 2-nitromethylphen-1-yl (i.e., 2-$NO_2CH_2Ph$), 3-trimethylsilylphen-1-yl, 4-t-butyldimethylsilylphenl-1-yl, 4-vinylphen-1-yl, vinylidenebis (phenyl), and the like. The term "a $C_3$-$C_{10}$ aromatic radical" includes aromatic radicals containing at least three but no more than 10 carbon atoms. The aromatic radical 1-imidazolyl ($C_3H_2N_2$—) represents a $C_3$ aromatic radical. The benzyl radical ($C_7H_7$—) represents a $C_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group ($C_6H_{11}CH_2$—) is an cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a $C_6$ cycloaliphatic radical comprising a methyl group, the methyl group being a functional group which is an alkyl group. Similarly, the 2-nitrocyclobut-1-yl radical is a $C_4$ cycloaliphatic radical comprising a nitro group, the nitro group being a functional group. A cycloaliphatic radical may comprise one or more halogen atoms which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene-2,2-bis(cyclohex-4-yl) (i.e., —$C_6H_{10}C(CF_3)_2C_6H_{10}$—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl, 2-bromopropylcyclohex-1-yloxy (e.g. $CH_3CHBrCH_2C_6H_{10}O$—), and the like. Further examples of cycloaliphatic radicals include 4-allyloxycyclohex-1-yl, 4-aminocyclohex-1-yl (i.e., $H_2C_6H_{10}$—), 4-aminocarbonylcyclopent-1-yl (i.e., $NH_2COC_5H_8$—), 4-acetyloxycyclohex-1-yl, 2,2-dicyanoisopropylidenebis(cyclohex-4-yloxy) (i.e., —$OC_6H_{10}C(CN)_2C_6H_{10}O$—), 3-methylcyclohex-1-yl, methylenebis(cyclohex-4-yloxy) (i.e., —$OC_6H_{10}CH_2C_6H_{10}O$—), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., —$OC_6H_{10}(CH_2)_6C_6H_{10}O$—), 4-hydroxymethylcyclohex-1-yl (i.e., 4-$HOCH_2C_6H_{10}$—), 4-mercaptomethylcyclohex-1-yl (i.e., 4-$HSCH_2C_6H_{10}$—), 4-methylthiocyclohex-1-yl (i.e., 4-$CH_3SC_6H_{10}$—), 4-methoxycyclohex-1-yl, 2-methoxycarbonylcyclohex-1-yloxy (2-$CH_3OCOC_6H_{10}O$—), 4-nitromethylcyclohex-1-yl (i.e., $NO_2CH_2C_6H_{10}$—), 3-trimethylsilylcyclohex-1-yl, 2-t-butyldimethylsilylcyclopent-1-yl, 4-trimethoxysilylethylcyclohex-1-yl (e.g. $(CH_3O)_3SiCH_2CH_2C_6H_{10}$—), 4-vinylcyclohexen-1-yl, vinylidenebis (cyclohexyl), and the like. The term "a $C_3$-$C_{10}$ cycloaliphatic radical" includes cycloaliphatic radicals containing at least three but no more than 10 carbon atoms. The cycloaliphatic radical 2-tetrahydrofuranyl ($C_4H_7O$—) represents a $C_4$ cycloaliphatic radical. The cyclohexylmethyl radical ($C_6H_{11}CH_2$—) represents a $C_7$ cycloaliphatic radical.

As used herein the term "aliphatic radical" refers to an organic radical having a valence of at least one consisting of a linear or branched array of atoms which is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a $C_6$ aliphatic radical comprising a methyl group, the methyl group being a functional group which is an alkyl group. Similarly, the 4-nitrobut-1-yl group is a $C_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g. —$CH_2CHBrCH_2$—), and the like. Further examples of aliphatic radicals include allyl, aminocarbonyl (i.e., —$CONH_2$), carbonyl, 2,2-dicyanoisopropylidene (i.e., —$CH_2C(CN)_2CH_2$—), methyl (i.e., —$CH_3$), methylene (i.e., —$CH_2$—), ethyl, ethylene, formyl (i.e. —CHO), hexyl, hexamethylene, hydroxymethyl (i.e. —$CH_2OH$), mercaptomethyl (i.e., —$CH_2SH$), methylthio (i.e., —$SCH_3$), methylthiomethyl (i.e., —$CH_2SCH_3$), methoxy, methoxycarbonyl (i.e., $CH_3OCO$—), nitromethyl (i.e., —$CH_2NO_2$), thiocarbonyl, trimethylsilyl (i.e. $(CH_3)_3Si$—), t-butyldimethylsilyl, 3-trimethyoxysilypropyl (i.e., $(CH_3O)_3SiCH_2CH_2CH_2$—), vinyl, vinylidene, and the like. By way of further example, a $C_1$-$C_{10}$ aliphatic radical contains at least one but no more than 10 carbon atoms. A methyl group (i.e., $CH_3$—) is an example of a $C_1$ aliphatic radical. A decyl group (i.e., $CH_3(CH_2)_9$—) is an example of a $C_{10}$ aliphatic radical.

As noted, in a first aspect, the present invention relates to a copolyetherimide having a glass transition temperature of at least 240° C., and a weight average molecular weight as determined by gel permeation chromatography relative to polystyrene standards of at least 40,000 grams per mole, said copolyetherimide comprising structural units of the formulas (I) and (II)

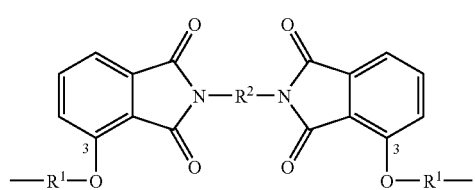

(I)

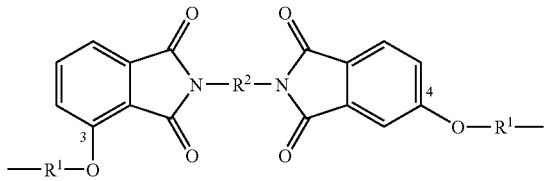

(II)

and structural units of the formula (III),

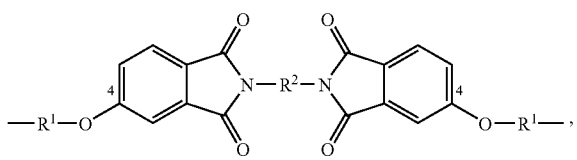

(III)

wherein $R^1$ is independently at each occurrence a divalent aromatic radical derived from bisphenol A or 4,4'-biphenol; $R^2$ is a divalent aromatic radical having formula (IV)

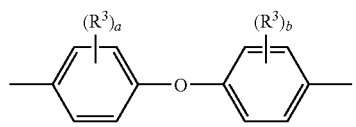

(IV)

wherein $R^3$ is independently at each occurrence halogen, a $C_1$-$C_{10}$ aliphatic radical, a $C_3$-$C_{12}$ cycloaliphatic radical, or a $C_3$-$C_{15}$ aromatic radical, and "a" and "b" are independently at each occurrence integers from 0 to 4;

said copolyetherimide being characterized by a mole percentage of structural units derived from 4,4'-biphenol in a range from about 55% to about 85% of all bisphenol-derived structural units present in the copolyetherimide composition;

said copolyetherimide being characterized by a mole percentage of structural units derived from bisphenol A in a range from about 45% to about 15% of all bisphenol-derived structural units present in the copolyetherimide composition;

said copolyetherimide being characterized by a total mole percentage of structural units derived from bisphenol A or 4,4'-biphenol of at least 95% of all bisphenol-derived structural units present in the copolyetherimide composition;

said copolyetherimide being characterized by a total amount of bisimide-containing structural units, said structures I, II, and III representing at least 95 percent of the total amount of bisimide-containing structural units;

said copolyetherimide being characterized by a molar ratio of structural subunits (V) and (VI)

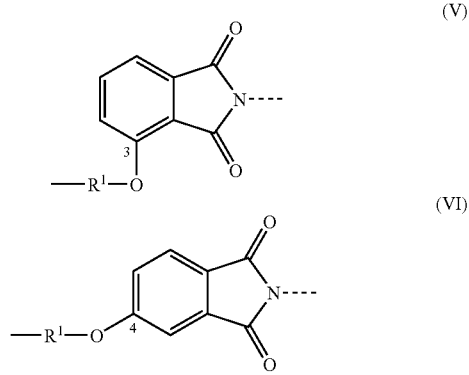

said molar ratio being in a range from about 85 mole percent (V) to about 99 mole percent (V) and about 15 mole percent (VI) to about 1 mole percent (VI).

Structural units (I), (II) and (III) represent chemical structures present in the copolyetherimides of the present invention wherein $R^1$ is a divalent aromatic radical derived from bisphenol A or 4,4'-biphenol (CAS No. 92-88-6). Structural units (I), (II), and (III) of the copolyetherimides of the present invention are formed, for example, by reaction of an oxydianiline such as 4,4'-oxydianiline (ODA, also known as "4,4'-diaminodiphenyl ether") with a mixture of 3-chlorophthalic anhydride and 4-chlorophthalic anhydride to form an isomeric mixture of bischloroimides. The bischloroimide mixture may then be reacted with a mixture comprising the disodium salt of bisphenol A and the disodium salt of 4,4'-bipshenol in an inert solvent at elevated temperature in the presence of a phase transfer catalyst to afford a copolyetherimide comprising structural units (I), (II), and (III). The relative amounts of 3-chlorophthalic anhydride and 4-chlorophthalic anhydride employed determine the relative amounts of each of structural units (I), (II), and (III) present in the copolyetherimide. Those skilled in the art will appreciate that when the amount 3-chlorophthalic anhydride employed is above a certain threshold level (for example 98 mole percent of the total amount of 3-chlorophthalic anhydride and 4-chlorophthalic anhydride employed), the amount of structural units (I) and (II) will be present in the product copolyetherimide to a much greater extent than structural unit (III). At some point, the amount of structural unit (III) present in the product copolyetherimide is sufficiently low that it does not affect the overall performance characteristics of the polymer. An amount of structural unit (III) representing less than about 0.1 percent by weight of the total weight of the copolyetherimide composition is considered sufficiently low such that it does not affect the overall performance characteristics of the material.

The copolyetherimides of the present invention may comprise bisphenol-derived structural units other than those derived from bisphenol A (BPA) and 4,4'-biphenol (BP). Copolyetherimides comprising structural units derived from one or more bisphenols other than BPA and BP may be prepared by incorporating additional bisphenol salts into the polymerization reaction mixture. For example, the bischloroimide derived from 4,4'-oxydianiline and a mixture of 3-chlorophthalic anhydride and 4-chlorophthalic anhydride may be reacted with a mixture comprising the disodium salt of bisphenol A, the disodium salt of 4,4'-biphenol, and the disodium salt of bisphenol Z (4,4'cyclohexilidenebisphenol CAS No. 843-55-0) in an inert solvent at elevated temperature in the presence of an organic phase transfer catalyst such as hexaethylguanidium chloride to afford a copolyetherimide comprising structural units (I), (II), and (III) wherein $R^1$ is divalent aromatic radical derived from bisphenol A or 4,4'-biphenol, and one or more structural units identical to structural units (I), (II), or (III) with the exception that $R^1$ is divalent aromatic radical derived from bisphenol A; 4,4'-biphenol; or bisphenol Z. The copolyetherimides of the instant invention are constituted such that the mole percentage of structural units derived from bisphenol A or 4,4'-biphenol is at least 95% of all bisphenol-derived structural units present in the copolyetherimide composition. Thus, in the example above of the formation of a copolyetherimide comprising structural units derived from bisphenol A, 4,4'-biphenol; and bisphenol Z, the mole percentage of structural units derived from bisphenol A and 4,4'-biphenol would be at least 95% of all bisphenol-derived structural units present in the copolyetherimide composition, and the mole percentage of structural units derived from bisphenol Z would be no more than 5% of all bisphenol-derived structural units present in the copolyetherimide composition. Examples of suitable bisphenols other than bisphenol A and 4,4'-biphenol which may be used to prepare the copolyetherimide compositions provided by the present invention are disclosed herein.

The copolyetherimides of the instant invention are constituted such that the mole percentage of structural units derived from 4,4'-biphenol I is in a range from about 55% to about 85% of all bisphenol-derived structural units present in the copolyetherimide composition. In one embodiment, the mole percentage of structural units derived from 4,4'-biphenol is in a range from about 75% to about 85% of all bisphenol-derived structural units present in the copolyetherimide composition. In another embodiment, the mole percentage of structural units derived from 4,4'-biphenol is in a range from about 80% to about 85% of all bisphenol-derived structural units present in the copolyetherimide composition.

The copolyetherimides of the instant invention are constituted such that the mole percentage of structural units derived from bisphenol A is in a range from about 45% to about 15% of all bisphenol-derived structural units present in the copolyetherimide composition. In one embodiment, the mole percentage of structural units derived from bisphenol A is in a range from about 25% to about 15% of all bisphenol-derived structural units present in the copolyetherimide composition. In another embodiment, the mole percentage of structural units derived from bisphenol A is in a range from about 20% to about 15% of all bisphenol-derived structural units present in the copolyetherimide composition.

In one embodiment, the present invention provides a copolyetherimide composition which is characterized by a mole percentage of structural units derived from 4,4'-biphenol in a range from about 75% to about 85% of all bisphenol-derived structural units present in the copolyetherimide composition, and a mole percentage of structural units derived from bisphenol A in a range from about 25% to about 15% of all bisphenol-derived structural units present in the copolyetherimide composition. In another embodiment, the present invention provides a copolyetherimide composition which is characterized by a mole percentage of structural units derived from 4,4'-biphenol in a range from about 80% to about 85% of all bisphenol-derived structural units present in the copolyetherimide composition, and a mole percentage of structural units derived from bisphenol A in a range from about 20% to about 15% of all bisphenol-derived structural units present in the copolyetherimide composition.

The copolyetherimide compositions of the present invention are characterized by a total amount of bisimide-containing structural units. Bisimide-containing structural units are illustrated by structures (I), (II) and (III). The copolyetherimide compositions of the present invention are constituted such that structures (I), (II), and (III) represent at least 95 percent of the percent of the total amount of bisimide-containing structural units. As noted, in structures (I), (II), and (III) $R^1$ is $R^1$ is independently at each occurrence a divalent aromatic radical derived from bisphenol A or 4,4'-biphenol; and $R^2$ is a divalent aromatic radical having formula (IV). Thus, while additional bisimide-containing structural units may be present in a copolyetherimide composition of the present invention, said additional bisimide-containing structural units constitute no more than 5 percent of the total amount of bisimide-containing structural units present in the copolyetherimide composition. Bisimide-containing structural units other than those represented by structures (I), (II), and (III) are illustrated by analogous structures wherein $R^1$ is a moiety derived from a bisphenol other than bisphenol A or 4,4'-biphenol.

As noted, the copolyetherimide compositions of the present invention are characterized by a molar ratio of structural subunits (V) and (VI). The copolyetherimide composition of the present invention are constituted such that the molar ratio of structural subunits (V) and (VI) is in a range from about 85 mole percent (V) to about 99 mole percent (V) and about 15 mole percent (VI) to about 1 mole percent (VI). In one embodiment, the molar ratio of structural subunits (V) and (VI) is in a range from about 90 mole percent (V) to about 99 mole percent (V) and about 10 mole percent (VI) to about 1 mole percent (VI). In another embodiment, the molar ratio of structural subunits (V) and (VI) is in a range from about 95 mole percent (V) to about 99 mole percent (V) and about 5 mole percent (VI) to about 1 mole percent (VI). In yet another embodiment, the molar ratio of structural subunits (V) and (VI) is in a range from about 98 mole percent (V) to about 99 mole percent (V) and about 2 mole percent (VI) to about 1 mole percent (VI).

As noted, structural units (I), (II) and (III) comprise the moiety $R^2$ which is a divalent aromatic radical having formula (IV)

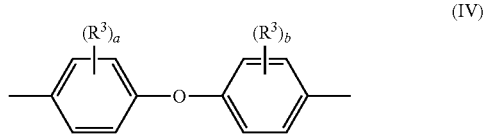

(IV)

wherein $R^3$ is independently at each occurrence halogen, a $C_1$-$C_{10}$ aliphatic radical, a $C_3$-$C_{12}$ cycloaliphatic radical, or a $C_3$-$C_{15}$ aromatic radical, and "a" and "b" are independently at each occurrence integers from 0 to 4. In one embodiment, $R^2$ is derived from at least one diamine selected from the group consisting of 4,4'-diaminodiphenyl ether; 2,2'-dimethyl-4,4'-diaminodiphenyl ether; 3,3'-dimethyl-4,4'-diaminodiphenyl ether; 2-methyl-4,4'-diaminodiphenyl ether; 2,2'-dichloro-4,4'-diaminodiphenyl ether; 2-chloro-4,4'-diaminodiphenyl ether; 2,2'-diphenyl-4,4'-diaminodiphenyl ether; 2-phenyl-4,4'-diaminodiphenyl ether; and mixtures thereof. As the foregoing discussion make clear, a copolyetherimide composition of the present invention may comprise structural groups derived from a plurality of oxydianilines. The copolyetherimide compositions of the present invention include, for example, a copolyetherimide composition comprising structural units derived from 3-chlorophthalic anhydride, 4-chlorophthalic anhydride, 4,4'-oxydianiline; 2-methyl-4,4'-diaminodiphenyl ether; bisphenol A, and 4,4'-biphenol appropriately limited with respect to the molecular weight, the glass transition temperature, and compositional parameters as disclosed herein.

As noted, the copolyetherimide compositions of the present invention are characterized by a glass transition temperature (Tg) of at least 240° C. as measured by differential scanning calorimetry. In one embodiment, the copolyetherimide composition has a Tg greater than about 250° C. In yet another embodiment the copolyetherimide composition has a Tg greater than about 255° C.

As noted, the copolyetherimide compositions of the present invention have a weight average molecular weight as determined by gel permeation chromatography relative to polystyrene standards of at least 40,000 grams per mole. In one embodiment, the copolyetherimide has a weight average molecular weight as determined by gel permeation chromatography (gpc) relative to polystyrene standards in the range from about 50,000 to about 80,000 grams per mole. Those skilled in the art will understand that the phrase "as determined by gel permeation chromatography relative to polystyrene standards" involves calibration of the gpc-instrument using polystyrene molecular weight standards having a known molecular weight. Such molecular weight standards are commercially available and techniques for molecular weight calibration are routinely used by those skilled in the art. The molecular weight parameters referred to herein contemplate the use of chloroform as the solvent used for the gpc analysis as reflected in the experimental section of this disclosure.

Typically, the copolyetherimide compositions of the present invention further comprise structural units derived from at least one chain termination agent. Those skilled in the art will appreciate that chain termination agents, sometimes referred to as "chain stoppers", are employed in order to control the molecular weight of the product polymer. In displacement-type polymerization reactions like those featured in the experimental section of this disclosure, almost any reactive mono-functional organic species can be used as a chain termination agent. Phthalic anhydride, the use of which is described in detail in the experimental section of this disclosure, is an especially convenient and cost effective chain termination agent.

In one embodiment, the chain termination agent comprises at least one aryl chloride having formula (VII)

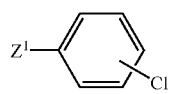
(VII)

wherein $Z^1$ is an activating moiety selected from the group consisting of acyl groups, phenacyl groups, alkyl sulfonyl groups, aryl sulfonyl groups, nitro groups, nitrile groups, azo groups, carboxy groups, and trifluoromethyl groups. Chain termination agents (VII) are lustrated by 4-chlorophenyl-t-butylketone, 4-chlorobenzophenone, 4-chlorophenylmethylsulfone, 4-chlorophenylphenylsulfone, 2-chloronitrobenzene, 4-chlorobenzonitrile, 4-chlorophenylazobenzene, 4-chlorobenzoic acid, 1-chloro-4-trifluoromethylbenzene, and the like.

In another embodiment, the chain termination agent comprises at least one chloroimide having formula (VIII)

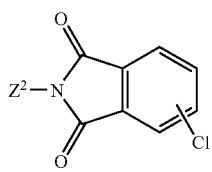
(VIII)

wherein $Z^2$ is a $C_1$-$C_{10}$ aliphatic radical, a $C_3$-$C_{12}$ cycloaliphatic radical, or a $C_3$-$C_{15}$ aromatic radical. Chain termination agents (VIII) are illustrated by N-phenyl-3-chlorophthalimide, N-phenyl-4-chlorophthalimide, N-phenyl-3-fluorophthalimide, N-phenyl-4-fluorophthalimide, N-methyl-3-chlorophthalimide, N-methyl-4-chlorophthalimide, N-butyl-3-chlorophthalimide, N-butyl-4-chlorophthalimide, and mixtures of two or more of the foregoing. In one embodiment, the chain termination agent is a mixture of N-phenyl-3-chlorophthalimide and N-phenyl-4-chlorophthalimide wherein the N-phenyl-3-chlorophthalimide is present in an amount corresponding to from about 85 mole percent to about 99 mole of the total amount of N-phenyl-3-chlorophthalimide and N-phenyl-4-chlorophthalimide present in said mixture, and the N-phenyl-4-chlorophthalimide is present in an amount corresponding to from about 15 mole percent to about 1 mole percent of the total amount of N-phenyl-3-chlorophthalimide and N-phenyl-4-chlorophthalimide present in said mixture.

In one embodiment, the copolyetherimide composition of the present invention has a glass transition temperature of at least 240° C., and a weight average molecular weight as determined by gel permeation chromatography relative to polystyrene standards of at least 40,000 grams per mole, said copolyetherimide comprising structural units of the formulas (IX) and (X)

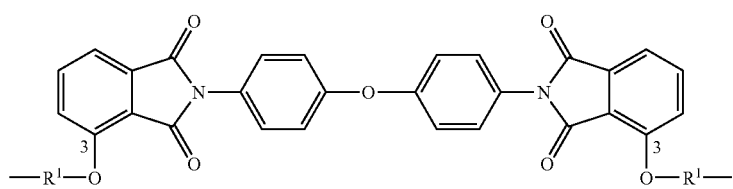
(IX)

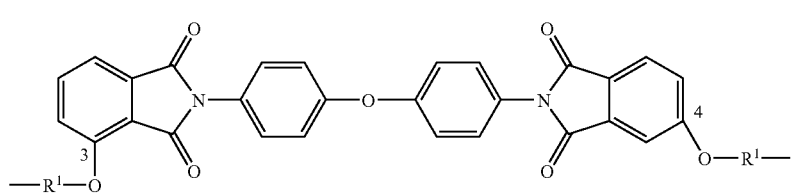
(X)

and structural units of the formula (XI),

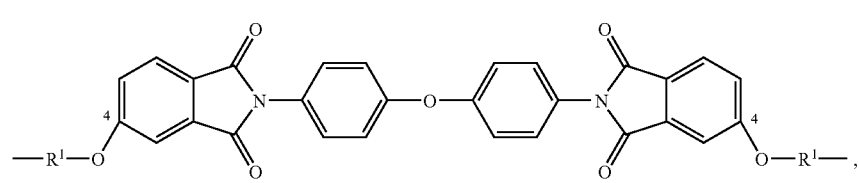
(XI)

wherein R¹ is independently at each occurrence a divalent aromatic radical derived from bisphenol A or 4,4'-biphenol;

said copolyetherimide being characterized by a mole percentage of structural units derived from 4,4'-biphenol in a range from about 55% to about 85% of all bisphenol-derived structural units present in the copolyetherimide composition;

said copolyetherimide being characterized by a mole percentage of structural units derived from bisphenol A in a range from about 45% to about 15% of all bisphenol-derived structural units present in the copolyetherimide composition;

said copolyetherimide being characterized by a total mole percentage of structural units derived from bisphenol A or 4,4'-biphenol of at least 95% of all bisphenol-derived structural units present in the copolyetherimide composition;

said copolyetherimide being characterized by a total amount of bisimide-containing structural units, said structures IX, X, and XI representing at least 95 percent of the total amount of bisimide-containing structural units;

said copolyetherimide being characterized by a molar ratio of structural subunits (V) and (VI)

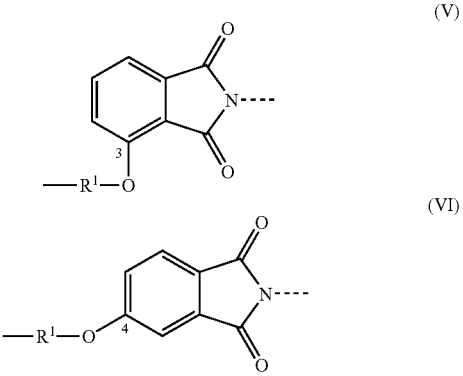

said molar ratio being in a range from about 85 mole percent (V) to about 99 mole percent (V) and about 15 mole percent (VI) to about 1 mole percent (VI).

Those skilled in the art will recognize that copolyetherimide compositions comprising structural units (IX), (X) and (XI) represent a subgenus of copolyetherimide compositions comprising structural units (I), (II) and (III) wherein the moiety R² is derived from 4,4'oxydianiline (ODA). In such a case, the subscripts "a" and "b" in formula (IV) are both equal to 0. The various limitations (e.g. glass transition temperature, molecular weight, composition) which apply to copolyetherimide compositions comprising structural units (I), (II) and (III) apply as well to copolyetherimide compositions comprising structural units (IX), (X) and (XI).

In yet another embodiment, the present invention provides a copolyetherimide composition comprising internal structural units and terminal structural units, wherein the internal structural units consist essentially of structural units having formulas (I), (II), and (III). Typically the terminal structural units are derived from a chain termination agent, for example a chain stopper selected from among the various chain stopper disclosed herein.

In yet still another embodiment, the present invention provides a copolyetherimide composition comprising internal structural units and terminal structural units, wherein the internal structural units consist essentially of structural units having formulas (IX), (X), and (XI).

As noted, the copolyetherimide compositions of the present invention may comprise structural units derived from one or more bisphenols in addition to bisphenol A and 4,4'-biphenol. In one embodiment, the copolyetherimide comprises structural units derived from at least one dihydroxy aromatic compound in addition to bisphenol A and 4,4'-biphenol, said dihydroxy aromatic compound having formula XII

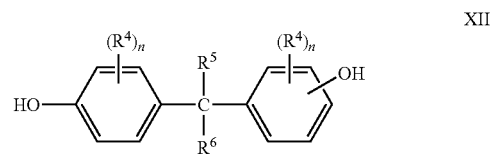

wherein $R^4$ is independently at each occurrence a halogen, a $C_1$-$C_{30}$ aliphatic radical, a $C_3$-$C_{30}$ cycloaliphatic radical, or a $C_3$-$C_{30}$ aromatic radical, $R^5$ and $R^6$ are independently hydrogen, a $C_1$-$C_{30}$ aliphatic radical, $C_3$-$C_{30}$ cycloaliphatic radical, or a $C_3$-$C_{30}$ aromatic radical or $R^5$ and $R^6$ together form a $C_3$-$C_{20}$ cycloaliphatic radical and "n" is independently at each occurrence an integer having a value 0 to 4; and wherein bisphenol A and 4,4'-biphenol are excluded from the group of dihydroxy aromatic compounds encompassed by formula (XII).

The hydroxy-substituted aromatic compounds having a formula XII are illustrated by bisphenols selected from the group consisting of 1,1-bis(4-hydroxyphenyl)cyclopentane; 2,2-bis(3-allyl-4-hydroxyphenyl)propane; 2,2-bis(2-t-butyl-4-hydroxy-5-methylphenyl)propane; 2,2-bis(3-t-butyl-4-hydroxy-6-methylphenyl)propane; 2,2-bis(3-t-butyl-4-hydroxy-6-methylphenyl)butane; 2,2-bis(3-methyl-4-hydroxyphenyl)propane; 2,2-bis(4-hydroxyphenyl)-1,1,1,3,3,3-hexafluoropropane; 1,1-bis(4-hydroxyphenyl)-2,2,2-trichloroethane; 1,1-bis(4-hydroxyphenyl)norbornane; 1,2-bis(4-hydroxyphenyl)ethane; 1,3-bis(4-hydroxyphenyl)propenone; bis(4-hydroxyphenyl)sulfide; 4,4-bis(4-hydroxyphenyl)pentanoic acid; 4,4-bis(3,5-dimethyl-4-hydroxyphenyl)pentanoic acid; 2,2-bis(4-hydroxyphenyl) acetic acid; 2,4'-dihydroxydiphenylmethane; bis(2-hydroxyphenyl)methane; bis(4-hydroxyphenyl)methane; bis (4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl) ethane; 1,1-bis(4-hydroxyphenyl)propane; 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4- hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 2,2-bis(4-hydroxy-3-ethylphenyl)propane; 2,2-bis(4-hydroxy-3,5-dimethylphenyl)propane; 2,2-bis(3,5,3',5'-tetrachloro-4,4'-dihydroxyphenyl)propane; 1,1-bis(4-hydroxyphenyl)cyclohexylmethane; 2,2-bis(4-hydroxyphenyl)-1-phenylpropane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4-bis(4-hydroxyphenyl)heptane; 1,1-bis(4-hydroxyphenyl)decane; 1,1-bis(4-hydroxyphenyl)cyclododecane; 1,1-bis(3,5-dimethyl-4-hydroxyphenyl)cyclododecane; and 2,2-bis(4-hydroxyphenyl)adamantane.

Methods for the preparation of copolyetherimide compositions are described in many publications and patents, and any of the appropriate methods may be employed to prepare the copolyetherimides of the invention. Illustrative methods of making the polyetherimides are those disclosed in, for example, U.S. Pat. Nos. 3,847,867, 3,814,869, 3,850,885, 3,852,242, 3,855,178, 3,983,093, and 5,830,974.

Suitable methods for the preparation of the copolyetherimide compositions of the present invention include the reaction, in the presence of a phase transfer catalyst, of a mixture comprising 3,3'- and 3,4'-disubstituted bis(halophthalimides) with a mixture of the di-alkali metal salts of bisphenol A and 4,4'-biphenol. In various embodiments 3,3'-; 3,4'-; and 4,4'-disubstituted bis(halophthalimides) are illustrated by formulas (XIII), (XIV), and (XV), respectively:

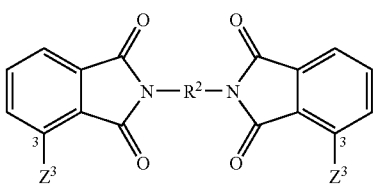

(XIII)

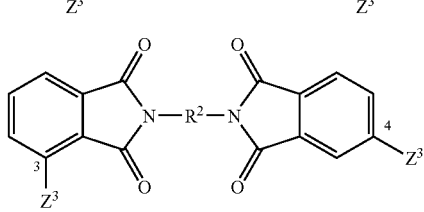

(XIV)

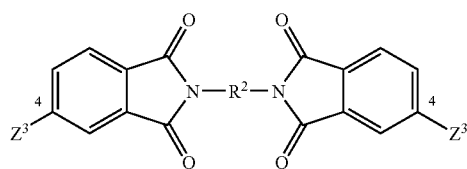

(XV)

wherein $R^2$ is defined as in formulas (I), (II) and (III), and $Z^3$ is selected from the group consisting of chloro, fluoro, bromo or nitro groups. Bis(halophthalimides) (XIII), (XIV), and (XV) are illustrated the bis(chlorophthalimide) prepared from 3-chlorophthalic anhydride and 4,4'-oxydianiline (illustrates bis(haloimide) (XIII)); the bis(chlorophthalimide) prepared from a mixture of 3-chlorophthalic anhydride and 4-chlorophthalic anhydride, and 4,4'-oxydianiline (illustrates bis(haloimide) (XIV)); and the bis(chlorophthalimide) prepared from 4-chlorophthalic anhydride and 4,4'-oxydianiline (illustrates bis(haloimide) (XV)). In some particular embodiments a suitable method to prepare the copolyetherimides is by the reaction, in the presence of a phase transfer catalyst, of the disodium salts of bisphenol A and 4,4'-biphenol with a mixture comprising 3,3'-; 3,4'- and, optionally 4,4'-dichloro-substituted [N-phthalimidophenyl]ethers, wherein the said ethers are derived from 4,4'-oxydianiline (4,4'-diaminodiphenyl ether).

In various embodiments phase transfer catalysts are those that are stable at relatively high temperatures. The phase transfer catalysts include quaternary phosphonium salts of the type disclosed in U.S. Pat. No. 4,273,712; N-alkyl-4-dialkylaminopyridinium salts of the type disclosed in U.S. Pat. Nos. 4,460,778 and 4,595,760; guanidinium salts of the type disclosed in U.S. Pat. Nos. 5,132,423 and 5,116,975, and phosphazenium salts of the type disclosed in copending U.S. patent application Ser. No. 10/950,874 filed Sep. 24, 2004. In some particular embodiments suitable phase transfer catalysts, by reason of their exceptional stability at high temperatures and their effectiveness to produce high molecular weight aromatic polyether polymers in high yield are alpha-omega-bis(pentaalkylguanidinium)alkane salts and hexaalkylguanidinium salts including, but not limited to, hexaalkylguanidinium halides and especially hexaalkylguanidinium chlorides are often employed in particular embodiments.

Methods for employing guanidinium salts are disclosed, for example, in U.S. Pat. No. 5,229,482.

In various embodiments the mixture di-alkali metal salts of bisphenol A and 4,4'-biphenol, for example a mixture of the disodium salt of bisphenol A and the disodium salt of 4,4'-biphenol, are contacted with a suitable mixture of bis(chlorophthalimide) prepared from 3-chlorophthalic anhydride, 4-chlorophthalic anhydride and 4,4'-oxydianiline at reflux in at least one relatively high boiling solvent in the presence of the phase transfer catalyst. In various embodiments said solvent has a boiling point above about 150° C. in order to facilitate the reaction which typically requires temperatures in the range of between about 125° C. and about 250° C. Suitable solvents of this type include, but are not limited to, ortho-dichlorobenzene, para-dichlorobenzene, dichlorotoluene, 1,2,4-trichlorobenzene, diphenyl sulfone, phenetole, anisole and veratrole, and mixtures thereof. In some embodiments of the invention it may be preferred not to prepare copolyetherimides in a dipolar aprotic solvent, for reasons such as cost and ease of solvent recycle.

Chain termination agents may optionally be in admixture with bis-substituted bis(phthalimide) monomers. In one embodiment mono-substituted bis-phthalimide chain termination agents may optionally be in admixture with bis-substituted bis-phthalimide monomers. In one particular embodiment monochlorobisphthalimidophenyl ether chain termination agents may often be in admixture with at least one bis-substituted (N-phthalimido)phenyl ether including, but not limited to, at least one bis(chloro-N-phthalimido)phenyl ether.

Chain-termination of copolyetherimides with mono-substituted chain-termination agents such as a monochlorophthalimide or a monochloro bis(phthalimide) results in copolyetherimide chains comprising unsubstituted phthalimide end-groups. The amount of chain termination agent is typically adjusted to afford a copolyetherimide having a weight average molecular weight, as determined by gel permeation chromatography relative to polystyrene standards, in the range of from at least 40,000 to about 80,000 grams per mole in one embodiment and in the range of from at least 40,000 and about 70,000 in another embodiment. This is generally an amount of chain termination agent in the range in one embodiment of between about 1 and about 10 mole percent and in another embodiment of between about 2 and about 10 mole percent, based on disubstituted bis(halophthalimide) monomer. Copolyetherimides in various embodiments of the invention have end-groups which may comprise structural units derived from any chain termination agent or mixture of chain termination agents present in the reaction mixture. The copolyetherimides may be terminated in one embodiment with unsubstituted phthalimide end-groups in an amount in one embodiment in a range of between about 2 mole % and about 8 mole %, in another embodiment in a range of between about 2.5 mole % and about 8 mole %, in another embodiment in a range of between about 3.5 mole % and about 8 mole %, in another embodiment in a range of between about 4.5 mole % and about 7.5 mole % and in still another embodiment in a range of between about 5 mole % and about 7 mole %.

Compositions comprising copolymers of the invention may be prepared optionally containing effective amounts of one or more additives known in the art, illustrative examples of which include, but are not limited to, antioxidants, flame retardants, drip retardants, UV blockers, nucleating agents, dyes, pigments, colorants, blowing agents, reinforcing agents, fillers, stabilizers, antistatic agents, processing aids, plasticizers, mold release agents, lubricants and the like. These additives are known in the art, as are their effective levels and methods of incorporation. Effective amounts of the additives vary widely, but they are sometimes present in an amount up to about 50% or more by weight, based on the weight of the entire composition. Appropriate amounts of additives may be readily determined without undue experimentation.

Illustrative examples of suitable fillers comprise particulate fillers (for example, fillers having an aspect ratio less than about 3), reinforcing fillers, conductive fillers (e.g., conductive carbon black, and vapor grown carbon fibers having an average diameter of about 3 to about 500 nanometers). Suitable reinforcing fillers are those which increase the rigidity of the composition. Amongst these, fibrous materials are preferred, in particular glass fibers such as those made from E, A, C, ECR, R, S, D, NE glasses and quartz. In some embodiments the fibers comprise low alkali E-glass. Suitable fibers include those with a fiber diameter of from about 8 to about 14 micrometers, the length of the glass fibers in the finished injection molding being from about 0.01 millimeters (mm) to about 0.5 mm. The glass fibers may be employed as rovings or as chopped or milled glass fibers, and may be provided with a suitable finish and an adhesion promoter or promoter system based on silanes. Other fibrous reinforcing materials, e.g. carbon fibers and microfibers, potassium titanate single-crystal fibers, gypsum fibers, aluminum oxide fibers, aluminum silicate fibers, magnesium oxide fibers or asbestos may also be incorporated. The amount of optional reinforcing filler is generally an amount sufficient to increase the rigidity of the composition. The amount of reinforcing fillers is advantageously from about 5% to about 60% by weight, especially from about 10% to about 40% by weight; all based on the total weight of the composition.

Non-fibrous fillers, e.g. glass beads, hollow glass beads, chalks, micas, talcs, quartzes and natural or calcined kaolins are further illustrative fillers, as are combinations of these materials with glass fibers. Like the glass fibers, these latter fillers may be provided with a finish and/or an adhesion promoter or adhesion promoter system. Mixtures of fillers may also be employed in compositions of the invention.

The copolyetherimides of the invention can be used to prepare articles requiring a higher use temperature than the previously available polyetherimides. Such articles may be used in applications such as, but not limited to, food storage, airplane parts, medical devices and microelectronics. Articles comprising the copolyetherimide compositions of the present invention may be prepared, for example, by any method known to those skilled in the art such as compression molding, blow molding and extrusion.

EXAMPLES

The following examples are set forth to provide those of ordinary skill in the art with a detailed description of how the methods claimed herein are evaluated, and are not intended to limit the scope of what the inventors regard as their invention. Unless indicated otherwise, parts are by weight, and temperature is in ° C.

Throughout the experimental descriptions which follow reference is made to 4-chlorophtahlic anhydride (4ClPA) and 3-chlorophthalic anhydride (3ClPA). The 4ClPA employed contained 96.76% 4ClPA, 2.59% 3ClPA, 0.3% phthalic anhydride (PA) and 0.35% volatiles. The 3ClPA employed contained 1.5% 4ClPA, 98.2% 3ClPA, 0.01% PA, 0.27% unidentified components, 0.17% volatiles. The percentages of the various constituents of the chlorophthalic anhydride compositions, for example 96.76% 4ClPA, are expressed as percent by weight. "Volatiles" refers to unidentified volatile components of the chlorophthalic anhydride compositions employed.

General Method for Preparation of ODA-ClPAMI in Solution

Although the 3ClPA and 4ClPA employed comprised a certain amount of phthalic anhydride as an impurity, additional phthalic anhydride was added in order to assure a proper level of chain stopper in subsequent polymerization reactions. An empirical correlation between % chain stopper and the experimentally observed molecular weight was developed to provide product polyetherimide having controlled molecular weights. The specific examples which follow indicate the level of chain stopper used. The percentages of the various components present in the 3ClPA and 4ClPA employed were taken into account when calculating the relative amounts of the reagents needed to achieve the desired 3ClPA to 4ClPA isomer ratio. HPLC and/or gas chromatography was used to analyze the amounts of 3ClPA and 4ClPA present in the mixture. The appropriate mixture of 3ClPA, 4ClPA and phthalic anhydride was reacted in ortho-dichlorobenzene (o-DCB) with 4,4'-oxydianiline (ODA, CAS No. 110-804) to provide a product mixture comprising the bis-chlorophthalimide of 4,4'-oxydianiline (ODA-ClPAMI) and a monochloro bisimide derived from reaction of the 4,4'-oxydianiline with phthalic anhydride and chlorophthalic anhydride. The monochloro bisimide served as the chain stopper in subsequent polymerization reactions. Additional 3ClPA, 4ClPA, or ODA could be added, if necessary, to drive the reaction to completion. The reaction mixture was typically heated to reflux and dried by continuous distillation of o-DCB through a short path distillation column into a receiver until the distillate comprised less than 10 ppm of water. The reaction mixture comprising the ODA-ClPAMI was then sufficiently dry for use in subsequent polymerization reactions.

General Method for Preparation and Isolation of Solid ODA-ClPAMI

The required amounts of 3ClPA and 4ClPA (2 equivalents) were charged to a reactor equipped with a nitrogen inlet, gas outlet, mechanical stirrer and short-path distillation head together with 1 equivalent of 4,4'-oxydianiline (ODA). The reactor was purged with nitrogen. Sufficient o-DCB was added to produce a mixture comprising 15% solids. The mixture was then heated slowly to 180° C. Water of reaction was removed by azeotropic distillation over approximately 3 hours. As the reaction temperature increased the mixture turned into a thick paste which dissolved on further heating to give a light yellow solution at about the reflux temperature of the mixture. It was observed that the intended reaction stoichiometry could be achieved through slight adjustments to the reaction conditions employed. For example, a vigorous reflux was found to aid in the dissolution and complete reaction of unreacted or partially reacted undissolved material which was at times observed to adhere to the reactor walls or stirrer. The reaction time was observed to be scale dependent. Reaction kinetics were followed by HPLC. Upon completion of the reaction, heating was discontinued and heptanes were added to the flask through an addition funnel while the reaction mixture was stirred gently. The yellow product bisimide precipitated and was subsequently isolated by filtration in quantitative yield. The product bisimide (a mixture of isomers) was dried in a vacuum oven for 24 hours under a stream of nitrogen at 175° C. to remove any residual volatile components (e.g. o-DCB, heptane). Product purity was determined by HPLC using aqueous acetonitrile as the eluent. The product could be further purified by recrystallization from o-DCB if needed. The isolated product ODA-ClPAMI was stored under nitrogen.

General Polymerization Method

A mixture comprising 3ClPA, 4ClPA and phthalic anhydride was treated with 4,4'-oxydianiline in o-DCB at reflux to provide the isomeric bis-chlorophthalimides, and isomeric monochlorophthalimides as a solution in o-DCB. Typically, the level of monochlorophthalimide chain stopper used was from about 3.8 to about 6 mole % in order to produce a product polyetherimide having a weight average molecular weight (Mw) in a range from about 40,000 grams per mole to about 65,000 grams per mole, as measured by gel permeation chromatography using polystyrene molecular weight standards. Solvent o-DCB was distilled from the reaction mixture until the distillate contained less than about 10 parts per million (ppm) water as determined by Karl-Fischer titration. A mixture of bisphenol A disodium salt and 4,4'-biphenol disodium salt was then added followed by additional o-DCB. The reaction mixture was heated at reflux, and distillation of o-DCB was continued until the distillate contained less than about 10 ppm of water. At this point the reaction mixture had a solids level of about 15% based on the weight of polymer anticipated. A solution of hexaethylguanidinium chloride (HEGCl) in o-DCB (20% wt solution; 2 mole %, relative to moles of salt mixture) was then added to the reaction mixture. The resulting polymerization reaction was exothermic and a vigorous reflux ensued. The polymerization mixture was heated at reflux under an argon atmosphere, and was monitored by GPC. When the target molecular weight was reached, the reaction was quenched with phosphoric acid, cooled, diluted with veratrole and o-DCB to approximately 10% solids. The polymer molecular weight measured before quenching was referred as the "synthesis molecular weight".

Polymer Purification

The quenched polymer solutions comprised about 10 weight percent polymer in a mixture of o-DCB and veratrole (1,2-dimethoxybenzene, CAS No. 91-16-70). The solvent mixture typically comprised about 40 percent by volume veratrole and about 60 percent by volume o-DCB. Approximately 1 percent by weight of water was then added to the quenched polymer solution at approximately 95° C. with stirring to agglomerate by-product sodium chloride (NaCl) particles. The addition of about 1% water was observed to increase the particle size of the NaCl by-product thereby rendering the mixture more amenable to filtration. The polymer solution was then filtered at 100° C. through a 10 micron NOMEX filter cloth at 20 psig. Solid sodium chloride particles were retained on the filter. Typically, the filtrate following filtration contained less than 10 ppm sodium chloride. In certain embodiments, the filtrate following filtration contained less than 1 ppm sodium chloride. The filtrate was then contacted with water in a continuous stirred tank mixer at 90° C. to remove the phase transfer catalyst, phase transfer catalyst by-products, and any remaining NaCl. The resultant two-phase system comprising the product polyetherimide in the veratrole-o-DCB solvent mixture and the aqueous phase was transferred to a separator (e.g. separatory funnel or other suitable vessel for effecting separation of the organic and aqueous phases) and the organic phase was separated from the aqueous phase. This aqueous extraction process was typically performed 2 or 3 times depending on the starting catalyst concentration. The residual catalyst in the polymer solution at the end of the extraction process was typically less than 20 ppm, and in some embodiments less than 10 ppm.

Polymer Isolation

The product polyetherimide was isolated via anti-solvent precipitation in laboratory scale experiments. In certain instances, the product polyetherimide was isolated via devolatilization extrusion. Suitable anti-solvents are illustrated by methanol, acetone and heptanes. To thoroughly remove residual o-DCB and veratrole solvents, the polymer was typically precipitated twice with suitable drying steps (15 mmHg vacuum, 180° C., 24 hrs.) after each precipitation. Devolatilization extrusion was carried out by feeding the solution of the product polymer into a devolatilizing extruder and separating the solvent through at least one vent located along the barrel of the extruder. The product polyetherimide was isolated as a melt at the extruder die face. The use of devolatilizing extruders to effect the separation of solutions of polymers into a solvent-rich component and a polymer rich component is known in the art and may be practiced, for example as described in U.S. Patent Application No. US 2005/0049393 A1 (Mar. 3, 2005) which is incorporated herein by reference in its entirety.

Polymer Extrusion and Molding

The product polyetherimides were extruded and molded at 380° C. using conventional polymer processing equipment.

Polymer Characterization

Polymer glass transition temperatures (Tg's) were measured using a Perkin Elmer Differential Scanning Calorimeter using a heating rate of 20° C. per minute and the half delta Cp convention. Notched Izod measurements were conducted using American Standard Test Method test procedure ASTM D256. Molecular weights were measured using gel permeation chromatography with reference to polystyrene standards. Rheology measurements were performed on a Rheometrics Dynamic Analyzer RDAIII using parallel plate geometry. Hydrolytic stability measurements were taken by monitoring polymer molecular weight change in molded test specimens as a function of water immersion time at 120° C. in a pressure autoclave.

Example 1

90/10 3/4 ClPA 80/20 BP/BPA PEI (ODA) (090503, 5 L-5)

4ClPA (30.5328 g, comprising 29.5435 grams (g) of 4ClPA, 0.7908 g of 3ClPA, 0.0916 g of PA), 3ClPA (265.1010 g, comprising 3.9765 g of 4ClPA, 260.3292 g of 3ClPA, 0.0265 g of PA), and PA (4.6506 g) were weighed out and charged a 5-liter (L) oil-jacketed reactor at room temperature together with oxydianiline (ODA, 163.5955 g). This combination of reactants was calculated to give 423.9661 g of the isomeric bischlorophthalimides and 15.6962 g of the isomeric PA-ClPA bisimides (4 mol % chain stopper based on ODA). The reactor was swept with nitrogen and 2245 mL of o-DCB was added to produce a mixture containing 15% solids. The mixture was then heated slowly to 180° C. while stirring. Water generated upon heating was removed by azeotropic distillation. The course of the reaction was followed by HPLC. The reaction was judged to be complete when less than 0.3% ClPA remained and no ODA was detectable. o-DCB was distilled throughout the reaction. The product mixture was considered suitable for use in a subsequent polymerization reaction when the distillate was shown by Karl-Fischer titration to contain less than 10 ppm of water. A mixture of 44.0348 g (0.1617 mol) of bisphenol A disodium salt and 148.9144 g (0.6469 mole) of 4,4'-biphenol disodium salt was then added followed by o-DCB. The reaction mixture was heated and stirred. o-DCB was distilled from the reaction mixture until the distillate contained less than 10 ppm of water and the final polymer would have 15% solids concentration based on the final weight of polymer anticipated. Hexaethylguanidinium chloride (HEGCl) in o-DCB 23.4 mL (20% wt solution; 2 mole %, relative to moles of salt mixture) was added and the polymerization reaction initiated. The polymerization reaction mixture was sampled for molecular weight analysis by GPC every 0.5 hour. When the target molecular weight of 60,000 grams per mole (Mw=60,000 and Mn=21420) had been reached, the reaction was quenched with phosphoric acid, cooled, diluted with veratrole and o-DCB to 10% solids. The polymer was isolated and purified as described in the general methods sections. The product polymer was extruded and molded into test specimens for Notched Izod testing. Molecular weight analysis by GPC on the test specimens revealed that the molecular weight (Mw) had dropped to 53,000 grams per mole as a result of the intervening processing steps. Notched Izod (NI) measurements were performed with a 2 lb hammer at room temperature. An average NI value of 2.7 foot pounds per inch (ft lb/in), and a maximum NI value of 3.2 ft lb/in were observed. The standard deviation for the measurements was 0.43 ft lb/in.

Example 2

90/10 3/4 ClPA 70/30 BP/BPA PEI (ODA) (090503, 5 L)

A mixture of 439.6623 g of the bis-chlorophthalimides prepared from 3ClPA and 4ClPA 4,4'-oxydianiline and sufficient PA to provide 4.0 mole % chain stopper, was heated to reflux in o-DCB in a 5-liter reactor equipped with a mechanical stirrer, short path distillation head, receiver, and inert gas inlet and exit. O-DCB was distilled from the mixture until the distillate contained less than 10 ppm of water by Karl-Fischer titration. A mixture of 66.0522 g (0.2426 mol) of bisphenol A disodium salt and 130.3001 g (0.5661 mole) of 4,4'-biphenol disodium salt was then added followed by additional o-DCB. o-DCB was distilled from the mixture until the distillate contained less than 10 ppm of water. The phase transfer catalyst, hexaethylguanidium chloride (23.4 mL as 20% wt solution; 2 mole %, relative to moles of salt mixture), was then added to initiate the polymerization reaction. When the target molecular weight (60,000 grams per mole) was reached, the reaction was quenched with phosphoric acid and isolated and molded into test specimens for Notched Izod testing. Molecular weight analysis by GPC on the test specimens revealed that the molecular weight (Mw) had dropped to 46,000 grams per mole as a result of the intervening processing steps. Notched Izod (NI) measurements were performed with a 2 lb hammer at room temperature. An average NI value of 2.3 ft lb/in, and a maximum NI value of 2.6 ft lb/in were observed. The standard deviation for the measurements was 0.3 ft lb/in.

The compositions of Examples 3-7 were prepared and evaluated as in Examples 1 and 2. Data for Examples 1-7 and Comparative Example 1 (CE-1) are gathered in Table 1. The data illustrate the improved impact performance of the compositions of the instant invention relative to the known polyetherimide, ULTEM 1000 (CE-1) as measured by Notched Izod testing.

constituted compositions (See Comparative Examples 2-8) falling outside of this unique composition space. For example, while compositions comprising more than 50 mole percent 4,4'-biphenol-derived structural units exhibit high Tg values (Tg>240°), compositions comprising more than about 85 mole percent 4,4'-biphenol-derived structural units are relatively insoluble and the growing polymer composition tends to precipitate from solution before high molecular weight is attained (See Comparative Examples 5-8). The limited solubility of the compositions of comparative Examples 5-8 also work to limit the glass transition temperature (Tg) of the materials since until a certain threshold molecular weight is achieved the Tg of a material is a function of its molecular weight. Comparative Example 2 when compared with Examples 9-11 illustrates this principle.

TABLE 1

COMPOSITIONS OF THE INVENTION RELATIVE TO ULTEM 1000 POLYETHERIMIDE

| | Composition (%) | | | | Mw (Kg/mole) | | Tg(° C.) | NI (ft lb/inch) | | |
|---|---|---|---|---|---|---|---|---|---|---|
| Example No. | 3-ClPA | 4-ClPA | BP | BPA | "Synthesis" | Molded | | Average | Max | Std Dev |
| Example-1 | 90 | 10 | 80 | 20 | 60 | 52 | 253 | 2.7 | 3.2 | 0.43 |
| Example-2 | 90 | 10 | 70 | 30 | 60 | 46 | 248 | 2.3 | 2.6 | 0.3 |
| Example-3 | 90 | 10 | 80 | 20 | 50 | 41 | 245 | 0.45 | 0.9 | 0.28 |
| Example-4 | 90 | 10 | 80 | 20 | 40 | 35 | 245 | 0.6 | 1.06 | 0.29 |
| Example-5 | 90 | 10 | 80 | 20 | 55 | 49 | 254 | 2.6 | 3.2 | 0.4 |
| Example-6 | 90 | 10 | 80 | 20 | 42 | 43 | 253 | 1.2 | 2 | 0.5 |
| Example-7 | 98 | 2 | 80 | 20 | 60 | 53 | 253 | 2.3 | | |
| CE-1 | 4 | 96 | 0 | 100 | | 54.3 | 218 | ~0.9 | | |

Example 8

98/2 3/4 ClPA 60/40 BP/BPA PEI (ODA) (20303)

Bisphenol A disodium salt (4.6981 g, 17.2562 mmol), 4,4'-biphenol disodium salt (2.6479 g, 11.5042 mmol), and o-DCB (60 mL) were combined in a reaction vessel equipped with a mechanical stirrer, short path distillation head, receiver, and inert gas inlet and exit. o-DCB was distilled from the mixture until the distillate contained less than 10 ppm of water. Approximately 20 to 30 mL of o-DCB was removed in this drying step. Then, 15.3885 g (29.0716 mmol) of the bischlorophthalimide prepared from ODA and 98% 3ClPA, 2% 4ClPA, and 0.1334 g (0.5177 mmol) of 4-chloro-N-methyl phthalimide chain stopper were added quantitatively to the reaction vessel along with 10-20 mL of additional o-DCB. O-DCB was distilled from the mixture until a solids level of 25% was reached. Hexaethylguanidium chloride phase transfer catalyst (0.7 mole %) was then added and polymerization initiated. The product polyetherimide had a weight average molecular weight (Mw) of 60,282 grams per mole and a number average molecular weight (Mn) of 24,100 grams per mole.

The compositions of Examples 9-16 and Comparative Examples 2-8 were prepared similarly. Data for Examples 9-16 and Comparative Examples 2-8 are gathered in Table 2 below. The data illustrate the unique performance characteristics of compositions falling within the compositional space defined by the present invention compared with similarly

TABLE 2

| Example No. | 3-ClPA | 4-ClPA | BP | BPA | $M_w$ (Kg/mol)$^a$ | Tg(° C.) |
|---|---|---|---|---|---|---|
| Example-8 | 98 | 2 | 60 | 40 | 60 | 252 |
| Example-9 | 98 | 2 | 80 | 20 | 48 | 253 |
| Example-10 | 98 | 2 | 80 | 20 | 60 | 258 |
| Example-11 | 98 | 2 | 80 | 20 | 53 | 253 |
| CE-2 | 98 | 2 | 80 | 20 | 35 | 238 |
| Example-12 | 98 | 2 | 80 | 20 | 51 | 254 |
| Example-13 | 90 | 10 | 80 | 20 | 47 | 243 |
| Example-14 | 98 | 2 | 80 | 20 | 51 | 253 |
| Example-15 | 90 | 10 | 60 | 40 | 50 | 241 |
| CE-3 | 50 | 50 | 80 | 20 | 52 | 229 |
| Example-16 | 90 | 10 | 80 | 20 | 60 | 249 |
| CE-4 | 50 | 50 | 60 | 40 | 42 | 223 |
| CE-5 | 70 | 30 | 80 | 20 | 22 | PPT* |
| CE-6 | 70 | 30 | 80 | 20 | 21 | PPT* |
| CE-7 | 95 | 5 | 90 | 10 | PPT* | PPT* |
| CE-8 | 90 | 10 | 90 | 10 | PPT* | PPT* |

$^a$"Synthesis molecular weight" (i.e. the weight average molecular weight of the product polymer prior to being quenched with phosphoric acid.
*Polymer precipitated from solution before high molecular weight and high Tg could be achieved.

While typical embodiments have been set forth for the purpose of illustration, the foregoing descriptions and examples should not be deemed to be a limitation on the scope of the invention. Accordingly, various modifications, adaptations, and alternatives may occur to one skilled in the art without departing from the spirit and scope of the present invention. It is also anticipated that advances in science and technology will make equivalents and substitutions possible that are not now contemplated by reason of the imprecision of language and these variations should also be construed where possible to be covered by the appended claims. All patents cited herein are incorporated herein by reference.

The invention claimed is:

1. A copolyetherimide having a glass transition temperature of at least 240° C., and a weight average molecular weight as determined by gel permeation chromatography relative to polystyrene standards of at least 40,000 grams per mole, and copolyetherimide comprising structural units of the formulas (I) and (II)

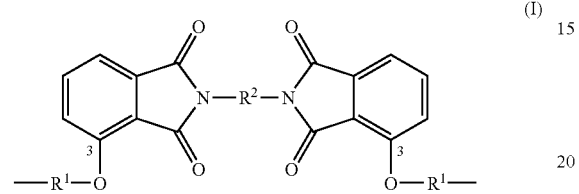

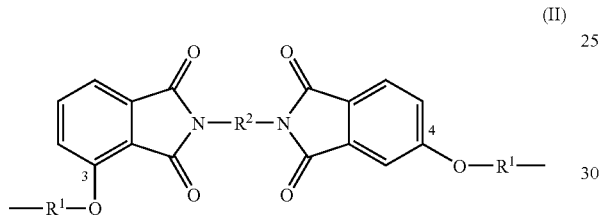

and structural units of the formula (III),

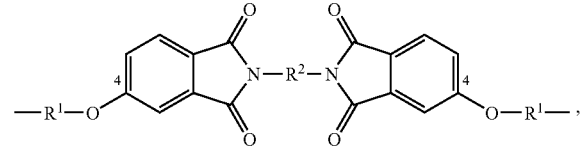

wherein $R^1$ independently at each occurrence a divalent aromatic radical derived from bisphenol A or 4,4'-biphenol; $R^2$ is a divalent aromatic radical having formula (IV)

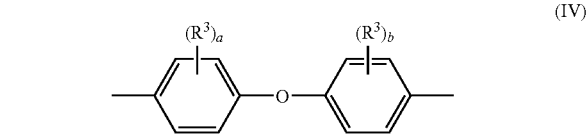

wherein $R^3$ is independently at each occurrence halogen, a $C_1$-$C_{10}$ aliphatic radical, a $C_3$-$C_{12}$ cycloaliphatic radical, or a $C_3$-$C_{15}$ aromatic radical, and "a" and "b" are independently at each occurrence integers from 0 to 4;

said copolyetherimide being characterized by a mole percentage of structural units derived from 4,4'-biphenol in a range from about 55% to about 85% of all bisphenol-derived structural units present in the copolyetherimide composition;

said copolyetherimide being characterized by a mole percentage of structural units derived from bisphenol A in a range from about 45% to about 15% of all bisphenol-derived structural units present in the copolyetherimide composition;

said copolyetherimide being characterized by a total mole percentage of structural units derived from bisphenol A or 4,4'-biphenol of at least 95% of all bisphenol-derived structural units present in the copolyetherimide composition;

said copolyetherimide being characterized by a total amount of bisimide-containing structural units, said structures I, II, and III representing at least 95 percent of the total amount of bisimide-containing structural units;

said copolyetherimide being characterized by a molar ratio of structural subunits (V) and (VI)

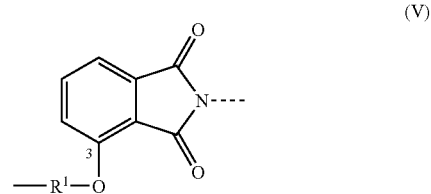

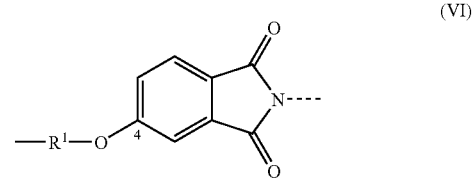

said molar ratio being in a range from about 85 mole percent (V) to about 99 mole percent (V) and about 15 mole percent (VI) to about 1 mole percent (VI).

2. The copolyetherimide according to claim 1 having a Tg greater than about 250° C.

3. The copolyetherimide according to claim 1 characterized by a mole percentage of structural units derived from 4,4'-biphenol in a range from about 75% to about 85% of all bisphenol-derived structural units present in the copolyetherimide composition, and a mole percentage of structural units derived from bisphenol A in a range from about 25% to about 15% of all bisphenol-derived structural units present in the copolyetherimide composition.

4. The copolyetherimide according to claim 1 characterized by a mole percentage of structural units derived from 4,4'-biphenol in a range from about 80% to about 85% of all bisphenol-derived structural units present in the copolyetherimide composition, and a mole percentage of structural units derived from bisphenol A in a range from about 20% to about 15% of all bisphenol-derived structural units present in the copolyetherimide composition.

5. The copolyetherimide according to claim 1 wherein the molar ratio of structural subunits (V) and (VI) is in a range from about 90 mole percent (V) to about 99 mole percent (V) and about 10 mole percent (VI) to about 1 mole percent (VI).

6. The copolyetherimide according to claim 1 wherein the molar ratio of structural subunits (V) and (VI) is in a range from about 95 mole percent (V) to about 99 mole percent (V) and about 5 mole percent (VI) to about 1 mole percent (VI).

7. The copolyetherimide according to claim 1 wherein the molar ratio of structural subunits (V) and (VI) is in a range from about 98 mole percent (V) to about 99 mole percent (V) and about 2 mole percent (VI) to about 1 mole percent (VI).

8. The copolyetherimide according to claim 1 wherein $R^2$ is derived from at least one diamine selected from the group consisting of 4,4'-diaminodiphenyl ether; 2,2'-dimethyl-4,4'-diaminodiphenyl ether; 3,3'-dimethyl-4,4'-diaminodiphenyl ether; 2-methyl-4,4'-diaminodiphenyl ether; 2,2'-dichloro-4,4'-diaminodiphenyl ether; 2-chloro-4,4'-diaminodiphenyl ether; 2,2'-diphenyl-4,4'-diaminodiphenyl ether; 2-phenyl-4,4'-diaminodiphenyl ether; and mixtures thereof.

9. The copolyetherimide according to claim 1 wherein $R^2$ is derived from 4,4'-diaminodiphenyl ether.

10. The copolyetherimide according to claim 1 further comprising structural units derived from at least one chain termination agent.

11. The copolyetherimide according to claim 10 wherein the chain termination agent comprises at least one aryl chloride having formula (VII)

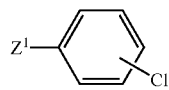

(VII)

wherein $Z^1$ is an activating moiety selected from the group consisting of acyl groups, phenacyl groups, alkyl sulfonyl groups, aryl sulfonyl groups, nitro groups, nitrile groups, azo groups, carboxy groups, and trifluoromethyl groups.

12. The copolyetherimide according to claim 10 wherein the chain termination agent comprises at least one chloroimide having formula (VIII)

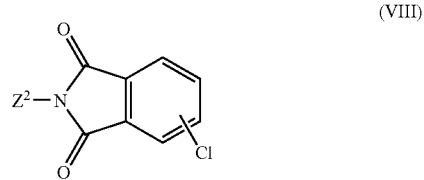

(VIII)

wherein $Z^2$ is a $C_1$-$C_{10}$ aliphatic radical, a $C_3$-$C_{12}$ cycloaliphatic radical, or a $C_3$-$C_{15}$ aromatic radical.

13. The copolyetherimide according to claim 1 which has a weight average molecular weight as determined by gel permeation chromatography relative to polystyrene standards in the range from about 50,000 to about 80,000 grams per mole.

14. A copolyetherimide having a glass transition temperature of at least 240° C., and a weight average molecular weight as determined by gel permeation chromatography relative to polystyrene standards of at least 40,000 grams per mole, said copolyetherimide comprising structural units of the formulas (IX) and (X)

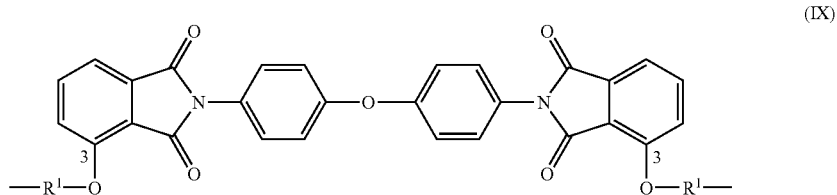

(IX)

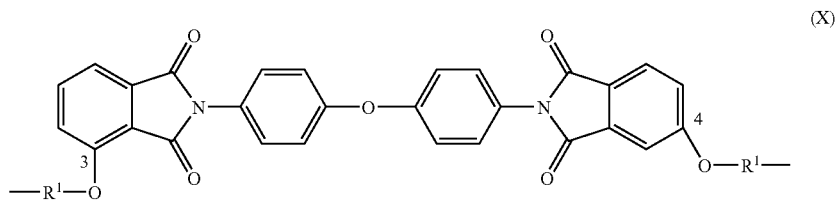

(X)

and structural units of the formula (XI),

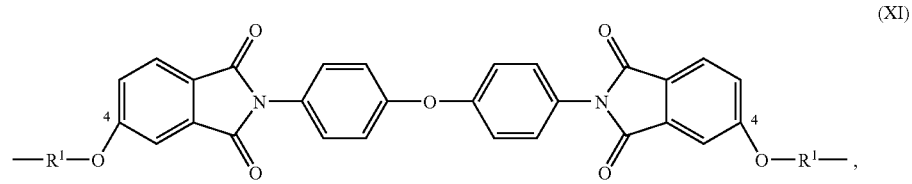

(XI)

wherein $R^1$ is independently at each occurrence a divalent aromatic radical derived from bisphenol A or 4,4'-biphenol;

said copolyetherimide being characterized by a mole percentage of structural units derived from 4,4'-biphenol in a range from about 55% to about 85% of all bisphenol-derived structural units present in the copolyetherimide composition;

said copolyetherimide being characterized by a mole percentage of structural units derived from bisphenol A in a range from about 45% to about 15% of all bisphenol-derived structural units present in the copolyetherimide composition;

said copolyetherimide being characterized by a total mole percentage of structural units derived from bisphenol A or 4,4'-biphenol of at least 95% of all bisphenol-derived structural units present in the copolyetherimide composition;

said copolyetherimide being characterized by a total amount of bisimide-containing structural units, said structures IX, X, and XI representing at least 95 percent of the total amount of bisimide-containing structural units;

said copolyetherimide being characterized by a molar ratio of structural subunits (V) and (VI)

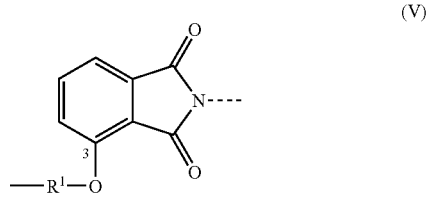

(V)

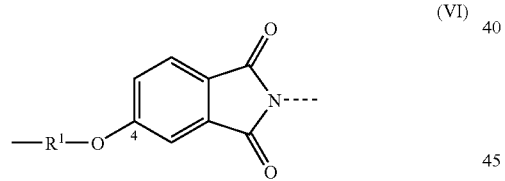

(VI)

said molar ratio being in a range from about 85 mole percent (V) to about 99 mole percent (V) and about 15 mole percent (VI) to about 1 mole percent (VI).

15. The copolyetherimide according to claim 14 having a Tg greater than about 250° C.

16. The copolyetherimide according to claim 14 characterized by a mole percentage of structural units derived from 4,4'-biphenol in a range from about 75% to about 85% of all bisphenol-derived structural units present in the copolyetherimide composition, and a mole percentage of structural units derived from bisphenol A in a range from about 25% to about 15% of all bisphenol-derived structural units present in the copolyetherimide composition.

17. The copolyetherimide according to claim 14 characterized by a mole percentage of structural units derived from 4,4'-biphenol in a range from about 80% to about 85% of all bisphenol-derived structural units present in the copolyetherimide composition, and a mole percentage of structural units derived from bisphenol A in a range from about 20% to about 15% of all bisphenol-derived structural units present in the copolyetherimide composition.

18. The copolyetherimide according to claim 14 wherein the molar ratio of structural subunits (V) and (VI) is in a range from about 90 mole percent (V) to about 99 mole percent (V) and about 10 mole percent (VI) to about 1 mole percent (VI).

19. The copolyetherimide according to claim 14 wherein the molar ratio of structural subunits (V) and (VI) is in a range from about 95 mole percent (V) to about 99 mole percent (V) and about 5 mole percent (VI) to about 1 mole percent (VI).

20. The copolyetherimide according to claim 14 wherein the molar ratio of structural subunits (V) and (VI) in a range from about 98 mole percent (V) to about 99 mole percent (V) and about 2 mole percent (VI) to about 1 mole percent (VI).

21. An article comprising the copolyetherimide of claim 1.

22. An article comprising the copolyetherimide of claim 14.

23. A copolyetherimide having a glass transition temperature of at least 240° C., and a weight average molecular weight as determined by gel permeation chromatography relative to polystyrene standards of at least 40,000 grams per mole, said copolyetherimide comprising internal structural units and terminal structural units, said internal structural units consisting essentially of structural units having formulas (I), (II), and (III)

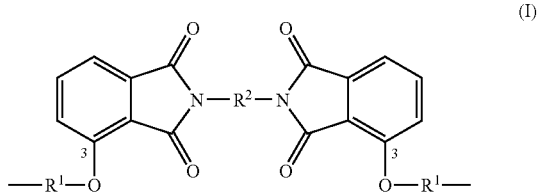

(I)

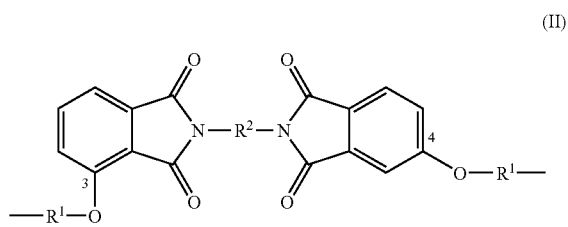

(II)

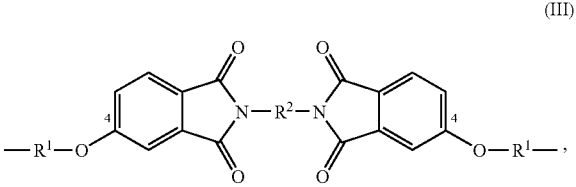

(III)

wherein R¹ is independently at each occurrence a divalent aromatic radical derived from bisphenol A or 4,4'-biphenol; R² is a divalent aromatic radical having formula (IV)

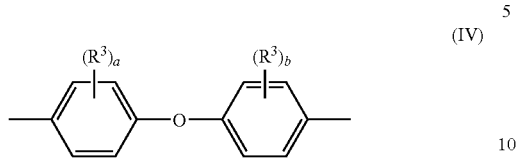
(IV)

wherein R³ is independently at each occurrence halogen, a $C_1$-$C_{10}$ aliphatic radical, a $C_3$-$C_{12}$ cycloaliphatic radical, or a $C_3$-$C_{15}$ aromatic radical, and "a" and "b" are independently at each occurrence integers from 0 to 4;

said copolyetherimide being characterized by a mole percentage of structural units derived from 4,4'-biphenol in a range from about 55% to about 85% of all bisphenol-derived structural units present in the copolyetherimide composition;

said copolyetherimide being characterized by a mole percentage of structural units derived from bisphenol A in a range from about 45% to about 15% of all bisphenol-derived structural units present in the copolyetherimide composition;

said copolyetherimide being characterized by a total mole percentage of structural units derived from bisphenol A or 4,4'-biphenol of at least 95% of all bisphenol-derived structural units present in the copolyetherimide composition;

said copolyetherimide being characterized by a total amount of bisimide-containing structural units, said structures I, II, and III representing at least 95 percent of the total amount of bisimide-containing structural units;

said copolyetherimide being characterized by a molar ratio of structural subunits (V) and (VI)

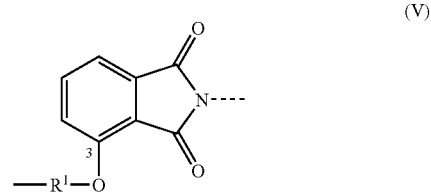
(V)

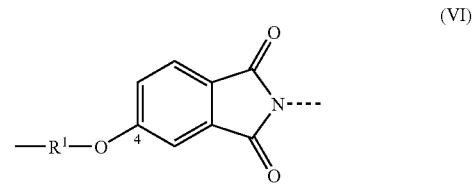
(VI)

said molar ratio being in a range from about 85 mole percent (V) to about 99 mole percent (V) and about 15 mole percent (VI) to about 1 mole percent (VI).

24. A copolyetherimide having a glass transition temperature of at least 240° C., and a weight average molecular weight as determined by gel permeation chromatography relative to polystyrene standards of at least 40,000 grams per mole, said copolyetherimide comprising internal structural units and terminal structural units, said internal structural units consisting essentially of structural units having formulas (IX), (X) and (XI)

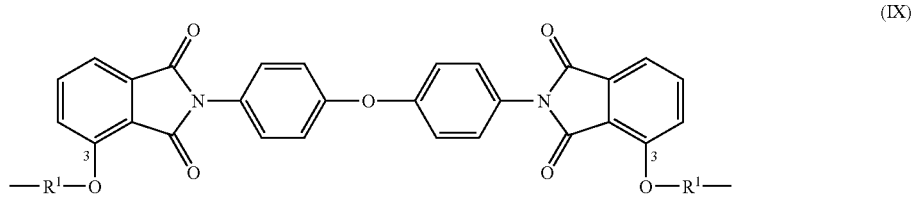
(IX)

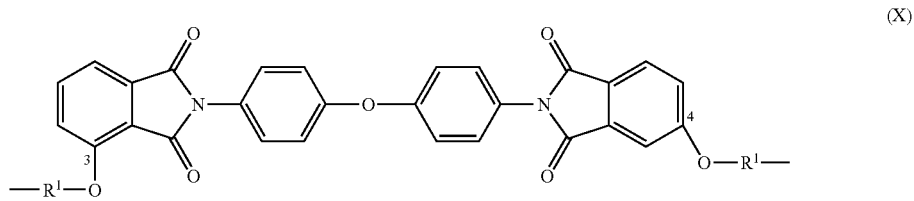
(X)

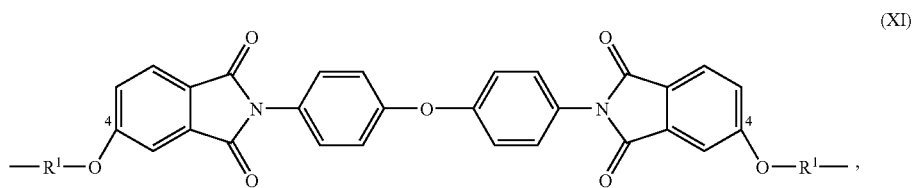
(XI)

wherein R¹ is independently at each occurrence a divalent aromatic radical derived from bisphenol A or 4,4'-biphenol;

said copolyetherimide being characterized by a mole percentage of structural units derived from 4,4'-biphenol in a range from about 55% to about 85% of all bisphenol-derived structural units present in the copolyetherimide composition;

said copolyetherimide being characterized by a mole percentage of structural units derived from bisphenol A in a range from about 45% to about 15% of all bisphenol-derived structural units present in the copolyetherimide composition;

said copolyetherimide being characterized by a total mole percentage of structural units derived from bisphenol A or 4,4'-biphenol of at least 95% of all bisphenol-derived structural units present in the copolyetherimide composition;

said copolyetherimide being characterized by a total amount of bisimide-containing structural units, said structures IX, X, and XI representing at least 95 percent of the total amount of bisimide-containing structural units;

said copolyetherimide being characterized by a molar ratio of structural subunits (V) and (VI)

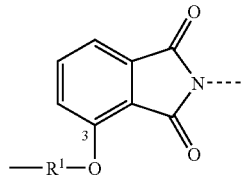

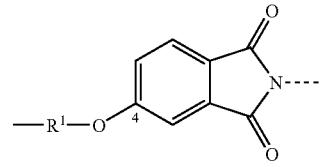

said molar ratio being in a range from about 85 mole percent (V) to about 99 mole percent (V) and about 15 mole percent (VI) to about 1 mole percent (VI).

* * * * *

UNITED STATES PATENT AND TRADEMARK OFFICE
CERTIFICATE OF CORRECTION

PATENT NO. : 7,605,222 B2  Page 1 of 1
APPLICATION NO. : 11/210164
DATED : October 20, 2009
INVENTOR(S) : Ye et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 104 days.

Signed and Sealed this

Fifth Day of October, 2010

David J. Kappos
*Director of the United States Patent and Trademark Office*